United States Patent
Lotem et al.

(10) Patent No.: US 9,569,201 B1
(45) Date of Patent: Feb. 14, 2017

(54) METHOD FOR TRANSLATING PRODUCT BANNERS

(71) Applicants: Amnon Lotem, Ramot Hashavim (IL); Gideon Cohen, Palo Alto, CA (US); Stav Kaufman, Tel Aviv (IL)

(72) Inventors: Amnon Lotem, Ramot Hashavim (IL); Gideon Cohen, Palo Alto, CA (US); Stav Kaufman, Tel Aviv (IL)

(73) Assignee: SKYBOX SECURITY INC., San Jose, CA (US)

( * ) Notice: Subject to any disclaimer, the term of this patent is extended or adjusted under 35 U.S.C. 154(b) by 259 days.

(21) Appl. No.: 13/932,195

(22) Filed: Jul. 1, 2013

Related U.S. Application Data

(60) Provisional application No. 61/670,604, filed on Jul. 12, 2012.

(51) Int. Cl.
*G06F 11/00* (2006.01)
*G06F 9/44* (2006.01)
*G06F 21/57* (2013.01)

(52) U.S. Cl.
CPC .............. *G06F 8/70* (2013.01); *G06F 21/577* (2013.01)

(58) Field of Classification Search
CPC ................. G06F 8/70; G06F 21/577
USPC ...................................... 726/22, 25
See application file for complete search history.

(56) References Cited

U.S. PATENT DOCUMENTS

| | | | |
|---|---|---|---|
| 5,715,466 A * | 2/1998 | Flanagan et al. | 704/5 |
| 8,683,584 B1 * | 3/2014 | Daswani et al. | 726/22 |
| 2001/0054011 A1 * | 12/2001 | Kimpara et al. | 705/26 |
| 2007/0094076 A1 * | 4/2007 | Perkowski et al. | 705/14 |
| 2012/0291059 A1 * | 11/2012 | Roberts et al. | 725/25 |
| 2013/0182182 A1 * | 7/2013 | Mountain | 348/564 |
| 2014/0189873 A1 * | 7/2014 | Elder et al. | 726/25 |

* cited by examiner

*Primary Examiner* — Haresh N Patel
(74) *Attorney, Agent, or Firm* — Reches Patents

(57) ABSTRACT

A method for automatically translating a banner information, the method may include receiving by a computer the banner information, wherein the banner information is included in at least one banner and describes an identity of a software product; and translating by the computer the banner information into a unique software product identifier using a content of knowledgebase that comprises an attributes schema and translation rules; wherein each software product is associated with a single unique software product identifier; wherein the unique software product identifier comprises a structured set of attributes; wherein at least one translation rule is a pattern based translation rule; wherein the attributes schema specifies a set of allowable attributes and of allowable values of the attributes.

15 Claims, 4 Drawing Sheets

METHOD FOR TRANSLATING PRODUCT BANNERS

RELATED APPLICATIONS

This patent application claims priority from U.S. provisional patent Ser. No. 61/670,604 filing date Jul. 12, 2012 which is incorporated herein by reference.

BACKGROUND

There is a tremendous variety in how software and hardware products are named and versioned across the IT industry. Even the same product might be named differently on different platforms, or be named differently by different IT inventory sources. For example "Microsoft Windows 2000 SP1 for 64-bit" and "Win2K Service Pack 1, x64" are actually names (banners) that refer to the same product and version. While that might be clear to humans (for example, to IT people), it is not obvious at all to machines (software applications) that are involved with processing that data. A standardized (normalized) representation of product names and versions is a key enabler for inventory management, compliance, and security automation. Some specific examples for that need are the following:

Product inventory management—when managing a product inventory for an organization, it should be possible to determine whether products reported by two different discovery tools are the same. If the names are not standardized, different names are not necessary an indication for different products. As a result the inventory might suffer from wrong duplication of products.

Compliance—Compliance might be involved with comparing the list of products and versions installed in an organization to an approved list of products and versions. The success of that comparison relies on standardization of product and version names.

Vulnerability Detection—it is possible to identify that a version of a product installed on a host is vulnerable by comparing its version to an inventory of vulnerabilities, in which the affected product and its version are indicated. To enable that, the indicated affected products and the information on products installed on the host should be represented in the same normalized way. This also applies for checking whether hosts in an organization are affected by a new published vulnerability (a threat alert). By the term host we relate to a computer or device (physical or virtual) on which software can be installed.

Malware Resilience Analysis—certain products are more prone to malware attack or propagation than others. Identifying the installation of these products within an organization is important for security management purposes. In order to successfully compare specifications of products associated with malware and the actual products installed on hosts at the organization, a normalized representation of product names is required.

The CPE (Common Platform Enumeration) [1, 2] is an open standard led by mitre.org for structured naming scheme of IT products. The Naming Specifications part of the standard defines the logical structure of the names. Product names according to CPE are broken into attributes, such as part, vendor, product, version, update, language, sw_edition, target_sw, and target_hw.

NIST (The US National Institute of Standards and Technology) maintains a dictionary (repository) of CPE names, covering the more common products and platforms [3].

While CPE could be a good choice for standardize the names and versions of IT products, it does not by its own resolve the above problems. Some of the issues and challenges are listed below:

The standard has not adopted yet by product, operating systems, and platform vendors. That means that the products installed on a host are named in a non-standardized format. Typically, operating systems or discovery tools will use two or three "banners" (free text strings) to describe the vendor, product (product title) and version of products installed on hosts, rather than using the CPE standard. There is no published method for automatically transforming that representation onto a CPE name.

There is no unique CPE dictionary (even not the official dictionary) that holds the name and version of all the products. In fact, when a vendor releases a new product, edition, version, or update, it does not have a process or commitment to assign to it or get for it a CPE name. That means that the content of a CPE dictionary is inherently partial. A version or edition of a product that an organization might have on its host might be missing in the CPE dictionaries.

The CPE standard supports multiple dictionaries. Each dictionary has to adopt the same CPE naming format, but can decide on the content of the names. So for example, one CPE dictionary might represent Windows 7 as "cpe:2.3:o: microsoft:windows:7:" (i.e. 7 is the version) while another dictionary might represent it as "cpe:2.3:o: microsoft:windows_7:-": (i.e. windows_7 is the product name, and the version field is empty). In principle, the inventory in the organization might be managed according one CPE dictionary (e.g., NIST) while a security service (such as a threat alerts service) might use a different dictionary for specifying the affected services of the new published vulnerabilities. That situation is an obstacle for a successful automation of vulnerability detection, for example.

ISO/IEC 19770-2 provides a standard for software identification (SWID) tags [6]. Software publishers (vendors) could use the standard to tag their software products, enabling by that the accurate identification of these products.

While SWID tags might contribute a lot to standardization, it does not solve the above problems by its own:

So far, only limited set of vendors adopted the standard. Therefore in many cases (if not the most) the discovery tools will not have SWID tags for the products they discover.

The set of attributes (tags) used by SWID is different than the set of attributes used by CPE. Currently there is no good mechanism for translating in between these standards. The gap between the standards might be reduced in the future but that might be a long process.

The methods described in this application provide a way for translating non-structured (or not enough structured) banners into a desired standard (normalized) format, and for converting names specified according to one standard into another.

SUMMARY

The application describes several methods that relate to product banner translation.

A method for automatically translating a banner or a set of banners that describe a product and its version into a structured set of product name attributes which comply with a specified attributes schema. The banner or banners consist of a text which describes the identity of a software product, possibly in a free format (relating to product name, version, edition, . . . ). The set of product name attributes can be considered as a unique identifier of the software product (according to some convention).

The attributes schema specifies both the set of the attributes, and the set or family of values that are valid for these attributes.

In particular the set of attributes might be according to a CPE dictionary.

The method relies on a knowledgebase and a translation algorithm which uses the knowledgebase.

The knowledgebase consists of a specification of the attributes schema and a set of translation rules.

The method enables translating banners that were known or unknown while building or updating the knowledgebase.

The method also enables translating banners that describe a version that was unknown while building or updating the knowledgebase.

The term version is used here in a wide way relating also to software edition, language, update, target hardware or software, and more.

A method for building an attributes schema based on a concrete products dictionary. An example for a concrete product dictionary is the official CPE dictionary by NIST.

A method for translating a set of attributes that specify a product and its version according to one dictionary to a set of attributes that specify that product and its version according to a second dictionary A method for translating the specifications of affected products of vulnerabilities and detecting vulnerabilities of a host The method uses the banner translation algorithm for translating the specifications of affected products of vulnerabilities into a normalized form, where the specifications of affected products typically appear in reports on new vulnerabilities or in vulnerability dictionaries. The method then detects vulnerabilities of a host by translating the banners of products of the host into the same normalized form, and checking for a match between the affected products of vulnerabilities (in their normalized form) and the host products (in their normalized forms). The normalized from relates to some structured set of product name attributes according to some dictionary or attributes schema.

There is provided a method for automatically translating a banner information, the method may include receiving by a computer the banner information, wherein the banner information is included in at least one banner and describes an identity of a software product; and translating by the computer the banner information into a unique software product identifier using a content of knowledgebase that comprises an attributes schema and translation rules; wherein each software product is associated with a single unique software product identifier; wherein the unique software product identifier comprises a structured set of attributes; wherein at least one translation rule may be a pattern based translation rule; wherein the attributes schema specifies a set of allowable attributes and of allowable values of the attributes.

There may be provided a non-transitory computer readable medium that stores instructions for: receiving by a computer, banner information, wherein the banner information is included in at least one banner and describes an identity of a software product; and translating by the computer the banner information into a unique software product identifier using a content of knowledgebase that may include an attributes schema and translation rules; wherein each software product is associated with a single unique software product identifier; wherein the unique software product identifier may include a structures set of attributes; wherein at least one translation rule is a pattern based translation rule; wherein the attributes schema specific a set of allowable attributes and of allowable values of the attributes.

The method may include determining the allowable values of the attributes by applying one or more validation rules.

The validation rules may determine allowable values of an attribute name by specifying at least one pattern for the attribute values.

The validation rules may define allowable content for attributes associated with at least one out of a certain vendor and a certain software product The pattern based translation rule may specify an allowable translation of a pattern of the banner information to value of an attribute of the unique software product identifier.

The method wherein a translation rule may include at least one pair of attribute name and an attribute value extracted from the pattern.

The attributes schema may specify a set of allowable attributes that complies with the Common Platform Enumeration (CPE) standard.

The translating may include outputting a banner information coverage rate indication.

The translating may include outputting a translation confidence score.

The translating may include applying alternative sequences of translating and validation rules to the banner information and to attributes extracted from the banner information.

The method applying of alternative sequences may include generating and using search nodes that represent attribute extraction alternatives that were explored during the applying of the translating.

Each search node may hold a set of values of attributes that have already been extracted according to the alternative and status information relating to the attributes.

The generating of the search nodes may include iteratively selecting an existing search node and applying validation or translation rules to the banner information or to already extracted attributes in order to validate an already extracted attribute or in order to extract additional attribute.

The method may include selecting extracted attribute values found by one of the alternative sequences of translating and validating rules.

The receiving of banner information may be preceded by receiving by the computer at least one vulnerability that is capable of affecting the software product; and wherein the translating is followed by associating the at least one vulnerability with the unique software product identifier.

The method may include evaluating a parameter of an attack that involves a computer that hosts the software product.

There may be provided a method for detecting vulnerabilities on a computer, the method may include receiving banner information relating to multiple software products hosted by the computer; for each software product of the plurality of software products, translating by the computer the banner information into a unique software product identifier using a content of knowledgebase that may include an attributes schema and translation rules; wherein each software product of the multiple software products is associated with a single unique software product identifier; wherein the unique software product identifier may include a structured set of attributes; wherein at least one translation rule is a pattern based translation rule; wherein the attributes schema specifies a set of allowable attributes and of allowable values of the attributes; and detecting vulnerabilities associated with the multiple software products.

There may be provided a non-transitory computer readable medium that stores instructions for receiving banner information relating to multiple software products hosted by the computer; for each software product of the plurality of software products, translating by the computer the banner information into a unique software product identifier using a content of knowledgebase that comprises an attributes schema and translation rules; wherein each software product of the multiple software products is associated with a single unique software product identifier; wherein the unique software product identifier comprises a structured set of attributes; wherein at least one translation rule is a pattern based translation rule; wherein the attributes schema specifies a set of allowable attributes and of allowable values of the attributes; and detecting vulnerabilities associated with the multiple software products.

The may include receiving vulnerability information that may include an association between vulnerabilities and software products that could be affected by the vulnerabilities.

The source of the vulnerability information may be a vulnerability dictionary.

The method may include receiving vulnerability information from a report on new published vulnerabilities.

The method may include identifying the vulnerabilities by matching between sets of name attributes of software products that are hosted by the computer and sets of name attributes of software products listed in vulnerability information.

The method may include receiving vulnerability information that may include information about vulnerabilities of a plurality of software products.

The vulnerability information may include a unique software product identifier per each software product of the plurality of software products, wherein each unique software product identifier may include a structured set of attributes.

The method may include translating for each software product of the plurality of software products, identification information included in the vulnerability information and related to the software product into a unique software product identifier.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
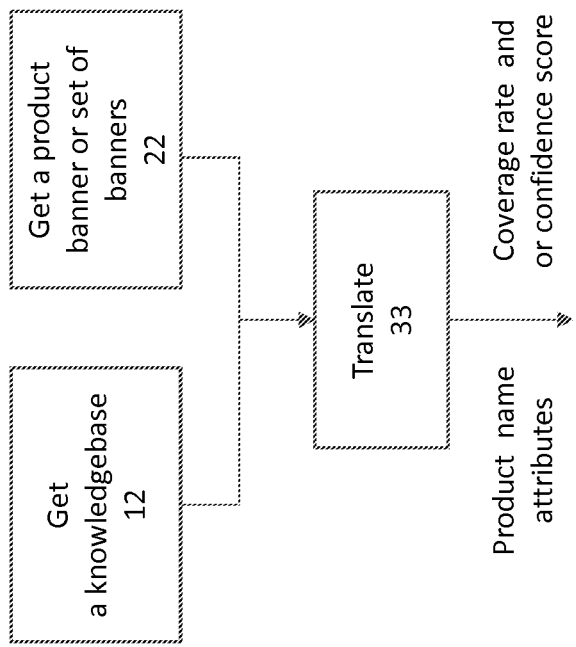
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Soft decoding of multi-dimensional codes includes methods for approximating optimal maximum likelihood decoding via sub-optimal algorithms with relatively low complexity.

The Knowledgebase

The Knowledgebase is a basis for the banner translation algorithm that is described later on.

The knowledgebase consists of a set of rules:

Validation rules—these rules specify the attribute schema: what are the valid product name attributes and what values of these attributes are acceptable Translation rules—these rules specify possible translations of vendor, product, and version terms into equivalent terms or into product name attributes The Validation Rules The validation rules specify for each software product supported by the knowledgebase the valid values for its name attributes (e.g., CPE name attributes). Typically a validation rule states that:

Attribute A of a product P can have value that matches pattern P, where P is some regular expression (or an explicit string)

For example:

The "sw_edition" attribute of the "windows_vista" product can have "enterprise" as a value The "update" attribute of the "windows_vista" product can have "sp([\d]+)" as a value (i.e., the string "sp" followed by an integer)

To make the rules more readable (and easy to maintain) macros can be used within patterns. A macro in this context is a predefined regular expression that is associated with a name. If for example, we define a macro with the name "int" and the pattern (regular expression) "([\d]+)", we can then write the second rule in the example below as following:

The "update" attribute of the "windows_vista" product can have "sp<int>" as a value The rules might also be more general, specifying a valid attribute for all the products of a vendor:

Attribute A of the products of vendor V can have value that matches pattern P, where P is some regular expression (or an explicit string).

For example the "update" attribute of the products of "Microsoft" vendor can have "sp<int>" as a value.

The rules might also not relate at all to vendor or product:

Attribute A can have value that matches pattern P, where P is some regular expression (or an explicit string)

For example:

a. The "target_hw" attribute can have "x64" as a value

A set of rules can specify the valid values for vendor attributes:

a. The "vendor" attribute can have "microsoft" as a value b. The "vendor" attribute can have "apple" as a value Another set of rules can specify the CPE product values of the vendors:

a. The "product" attribute of a product of the "microsoft" vendor can have "windows_vista" as a value b. The "product" attribute of a product of the "microsoft" vendor can have "windows_7" as a value As can be seen in the example above, the Vendor and the Product can optionally be specified as context for the rule (limiting the scope of the rule to a certain vendor or product).

In a possible implementation, the validation rules might be held using a table with the following fields:

| Name | Type | Description |
| --- | --- | --- |
| Rule ID | ID | The ID of the rule |
| Vendor Context | String | The vendor name (e.g., CPE vendor name); Empty if no vendor context |
| Product Context | String | The product name (e.g., CPE product name); Empty if no product context |
| Attribute Name | Attribute Name | a name of an attribute |
| Pattern | String | A regular expression which specifies the format and possible values of the element type.<br>'-' if the attribute is not applicable for the specified context. |

An example for the way the table is used for describing a vendor (Microsoft), product (Windows Vista), and the possible attribute values of a product is presented in the next table.

| Rule ID | Vendor Context | Product Context | CPE Name Attribute | Pattern |
| --- | --- | --- | --- | --- |
| 7 | | | vendor | microsoft |
| 8 | microsoft | | product | windows_vista |
| 9 | | windows_vista | version | — |
| 10 | | windows_vista | update | sp<int> |
| 11 | | windows_vista | update | beta |
| 12 | | windows_vista | update | beta<int> |
| 11 | | windows_vista | sw_edition | business |
| 11 | | windows_vista | sw_edition | enterprise |
| 11 | | windows_vista | sw_edition | home_basic |
| 12 | | windows_vista | target_hw | x64 |
| 13 | | windows_vista | target_sw | x86 |
| 14 | microsoft | | update | sp<int> |
| 13 | microsoft | | update | beta |
| 14 | microsoft | | update | beta<int> |
| 15 | | | target_hw | x64 |
| 16 | | | target_hw | x86 |
| 17 | | | target_hw | itanium |

Where <int> is a shortcut (macro) for a regular expression. e.g., the regular expression: "\d+".

The usage of small letters and the usage of '_' instead of blanks in this example is in order to fit the naming convention of the CPE standard.

The Translation Rules

The translation rules specify possible translations of terms or patterns appear in banners into equivalent terms or into valid values of product name attributes.

Typically a translation rule states that:

a. If a banner (optionally, of a specified vendor or product) includes pattern P then set the value of Attribute A1 to be Val1, and set the value of Attribute A2 to be Val2, . . . (zero or more attributes). P is some regular expression (or an explicit string), and Val1, Val2, . . . can be explicitly defined strings or some strings that are built based on what identified in the pattern For example:

a. If the banner includes "MS" then set the value of the "vendor" attribute to be "micro soft"

b. If the banner of "microsoft" product includes "Service Pack <int>" then set the value of the "update" attribute to be "sp$1".

$i appears in the attribute value (where is some integer) is replaced by the i-th regular expression group identified in the pattern. The $1 in this example relates to the identified integer number. i.e. "Service Pack 2" which is found in the banner, sets the value of the "update" attribute to "sp2".

The rules can be generic (without a context), as in the first example, or relate to a specific product, or to a specific vendor context, as in the second example (vendor context).

In a possible implementation, the translation rules might be held using a table with the following fields:

| Name | Type | Description |
| --- | --- | --- |
| Rule ID | ID | The ID of the rule |
| Vendor Context | String | The name of the vendor to which the banner translation rule is relevant (e.g., CPE vendor name). Can be empty (no context) |
| Product Context | String | The name of a product to which the banner translation rule is relevant (could be CPE product name or a product ID). Can be empty (no context) |
| Pattern | String | The pattern to be searched within the banner. The pattern can include macros (shortcuts for regular expressions) |

-continued

| Name | Type | Description |
| --- | --- | --- |
| Attribute 1 | Attribute Name | The name of the first attribute to be extracted. Empty if nothing to be extracted. "General" if the translation does not relate to a specific attribute |
| Attribute 1 Value | String | The value to be extracted for the first attribute. Is represented as a string which might include group index of a regular expression: $1, $2 . . . |
| Attribute 2 | Attribute Name | The name of the second attribute to be extracted. Empty if there is no second attribute for the rule. |
| Attribute 2 Value | String | The value to be extracted for the second attribute. Is represented as a string which might include group index of a regular expression: $1, $2 . . . |
| . . . more attributes . . . | . . . | . . . |
| Accept As Validated | Boolean | Defines whether to accept the extracted attribute as validated or require a validation by a validation rule |

Example for translation rules expressed using the above table is the following:

| Rule ID | Vendor Context | Product Context | Pattern | Attr. 1 | Attr. 1 Value | Attr. 2 | Attr. 2 Value |
| --- | --- | --- | --- | --- | --- | --- | --- |
| 1 | | | ms | vendor | microsoft | | |
| 2 | | | service pack (<int>) | update | sp$1 | | |
| 3 | | | 64-bit | target_hw | x64 | | |

Notes:
a. The translation rules (at least those with single attribute) can be used for successive translation actions of an attribute
b. An additional type of translation rules can be specified for combining a set of already identified attributes into another combined attribute (e.g., attr4=$attr1+"."+$attr2)

Macros

Macros are shortcuts for regular expressions. i.e., they consist of a pattern (regular expression) and associated name. A table with the following fields can be used for holding macros is a possible implementation of the knowledgebase.

| Name | Type | Description |
| --- | --- | --- |
| Macro ID | ID | The ID of the macro |
| Name | String | The name of the macro |
| Pattern | String | A regular expression |

Following is an example for the table content:

| Macro ID | Name | Pattern: |
| --- | --- | --- |
| 1 | dotted_version | [\d] + \.[\d\.] *\d |
| 2 | int | \d+ |

Macro names can be referred in validation and translation rule, For example, by specifying the name of the macro in < > brackets (e.g., <int>).

The knowledgebase can be built and maintained semi-automatically based on access to already defined product name dictionaries (such as NIST CPE dictionary) banner samples, and sample of name attributes (such as CPE names).

The knowledgebase can be maintained centrally and be distributed to the sites of different organizations in order to be used locally by a banner translation algorithm.

Alternatively it can be used by a software service that supplies banner translation services over the web.

Advantages of the Approach

Note that the presented approach for using attribute schema for specifying the valid attribute values is different from explicit enumeration of products and their known versions, as is done in many of the product dictionaries.

For the purpose of banner translation that approach has some advantages. The fact that the validation rules can relate to pattern (e.g., update=sp<int>) and the fact that the validation rules might relate to a wider context than a particular product (e.g., vendor context, or no context at all) helps to cope with the situation of partial knowledge of product versions and editions.

A banner of a known product might include version, update, or edition that was unknown when the knowledge base was built or updated. Even though, if the terms appear in the banner fit known pattern they will be identified and translated into a correct normalized form. For example, if it had been known that a product has only two updates sp1, and sp2, and the product banner includes sp3, this update will be identified correctly as it matches the sp<int> pattern. Similarly, if the product did not have in the past special hardware editions, and the reported banner includes the term "for x64", the fact that x64 is known as a target hardware in general (a validation rule without a context) enables identifying the target_hw attribute as x64.

The local nature of the translation rules that in many cases relate to possible translation or synonyms of a single attribute enables to represent in a compact way a wide range of potential banners for the product, not all of them are necessarily known at the time the knowledgebase is built or updated. For example, assume the following translation rules:
a. MS=>vendor=micro soft (this shortcut format for a translation rule states that if the banner includes "MS" then the value of the "vendor" attribute can be set to "micro soft")
b. Microsoft Inc.=>vendor=Microsoft
c. Microsoft Cooperation=>vendor=Microsoft
d. Win2K (when vendor=Microsoft)=> product=windows_2000
e. Service Pack(<int>) (when vendor=Microsoft)=> update=sp1$1
f. 64-bit=>x64

These translation rules (together with the validation rules for the microsoft vendor, and the windows_2000 product) enable to understand banners with any combination of the following terms: {Microsoft, Microsoft Inc., MS} {Windows 2000, Win2K} {Service Pack 1, Service Pack 2, . . . , sp1, sp2, . . . , empty} {x64, 64-bit, empty} and with any order of them.

This covers roughly 500 potential banners for the Windows 2000 product. Not all of them are necessarily in use or known at the time of building the knowledgebase, but they could be identified if used and appear in a reported product banner.

Explanation for the Number of Combinations:
a. There are 4! order permutations of the terms (vendor product, update, target_hw)
b. There are 3 alternative supported terms for the vendor
c. There are 2 alternative supported terms for the product
d. There are 7 alternative supported terms for service packs (we assumed up to three service packs, plus the empty option. In principle there might be more)
e. There are 2 alternative options for the target hardware (x64 and empty)
f. The number of combinations is 4!*3*2*7*3

The Banner Translation Algorithm

The Banner Translation process 10 is described schematically in FIG. 1.

The process starts with getting a knowledgebase (step 12), which is typically specified using a set of rules as described in the Knowledgebase section, and with getting a product banner (step 22)—a single banner or a set of banners related to the product such as vendor, product name, and version.

The process is then translates the banner (or set of banners) into a set of product name attributes that comply with the schema rules in the knowledgebase (step 32).

The translation also reports on the coverage rate of the banner—which percentage of the banner (or banners) was identified, and or what is the confidence score of the translation. The confidence score could be based on different criteria such as coverage rate (a relatively high coverage rate is mapped to a high confidence score), and the type of validation rules that were used. For example, a validation of an attribute using a validation rule with a product context contributes to a higher score than a validation using a rule without a context.

The translation is done using an algorithm which is described below.

The algorithm is built as a search algorithm. It searches for a "good" set of extracted attributes for the banner within the space of possibly extracted attributes (possible according to the translation and validation rules in the knowledgebase).

The translation and validation rules of the knowledgebase are used for developing valid attribute extraction alternatives.

An extraction alternative is the result of applying sequence of translation and validation rules to the banner and to already extracted attributes.

An extraction alternative is represented using a search node.

The search node holds the attributes extracted so far according to the alternative it represents and some properties for these attributes: status (translated/validated), banner location, etc.

The initial search node has no extracted attributes. As translation and validation rules are applied successfully to the banner, new extracted attributes are added to the search node.

When there is more than one option to extract the next attribute for a search node, the search node is split into several search nodes that represent the different extraction options (plus the already extracted attributes).

The case of no extraction of an attribute is also considered as an alternative, as not all the attributes might be relevant for a product, or might not be represented in the banner.

The algorithm maintains two lists of search nodes:
a. Open—the list of search nodes (alternatives) that their attribute extraction process is not completed yet.
b. Closed—the list of search nodes (alternatives) that their attribute extraction process was completed.

Initially, the open list includes only an empty search node (a node with no extracted attributes).

The algorithm continues to develop search nodes (i.e., create successor search nodes with additional extracted attributes) while the open list is not empty. A node that fails to fulfill minimal extraction requirements (after trying to extract attributes) is removed. A node that completed the extraction process of all attributes is moved to the closed list.

When the open list becomes empty the different alternatives represented by the closed search nodes are evaluated and compared to select the best, and good enough, extracted attributes set. That evaluation also optionally assigns a confidence score to the extracted attributes set.

When the banner of a product consists of a set of sub-banners (e.g., vendor banner, product banner, and version banner), the algorithm processes the sub-banners according to some order. The closed search nodes developed by the algorithm for the first sub-banner are used as the initial set of open nodes for the next sub-banner, and so forth.

Pseudo Code of the Algorithm
Algorithm Extract Attributes
Input:
a. A set of banners (a single banner or a set of sub-banners that describes a product). Each banner includes the banner string and optional set of associated properties such as its type (for example, single banner, vendor banner, product banner, version banner, etc.), the scope of attributes that might be extracted from it, the must have attributes to be extracted from it, and the minimal required coverage rate of the banner by extracted attributes.
b. Knowledgebase (sets of translation rules, validation rules, and macro definitions).
Output:
a. A list of extracted attributes (holds per attribute: attribute name and value).
b. A coverage rate and or a confidence score (optional).
Begin
While there are banners in the banners set
1. Pop a banner from the banners set (select a banner and remove it from the set)
2. Preprocess the banner (e.g., to get rid of non-required special or extra characters, such as registration marks or trademarks)
3. If it is the first banner in the banners set, set the open list to be a list with a single empty search node (a node with no extracted attributes).
4. Else, set the open list to be the closed list of the previously processed banner in the set
5. While there are open search nodes (extraction alternatives)
   5.1. Select an open search node for further attribute extractions (is denoted as the "current node")
   5.2. Select the next attribute to be processed for the current node (is denoted as the "current attribute")
   5.3. If there is no such attribute (all attributes were processed), move the search node from open to closed
   5.4. Else
     5.4.1. Process the extraction or validation of the current attribute, considering the already extracted attributes of the current node (more than one extraction option might be possible)
     5.4.2. Replace the current node by new search nodes in the open list, each of which holds the attributes of one extraction option ("result record") together with the previously extracted attributes of the current node. If no extraction option was found the node is removed (dead end).
6. End while
End while
Evaluate the nodes in the closed search nodes and select the best and good enough node
If no such node retrieve empty list (failure)
Else retrieve the set of attributes of the node (optionally, with a coverage rate and a confidence score)
End The processing of "the extraction or validation" of an attribute (mentioned above) can be performed by using the following procedure:
Procedure Process Attribute
Input: banner, search node, attribute
Output: results list
Each result record in the list holds for the input attribute (and possibly for additional identified attributes): value, status (translated/validates), and location within the banner
Begin
1. If the search node does not contain a value for the attribute,
  1.1. Apply to the banner translation and validation rules that relate to the attribute to be processed
2. Else, if the search node already contains a non-validated value for the attribute,
  2.1. Apply the translation and validation rules to that attribute value (for further translation of the attribute or for validation)
  2.2. For each successful application of a rule, add a result record to the results list with the value of the attribute and some attribute properties such as status and location within the banner. Translation rules might add more than one attribute to the result (based on the attributes number in the rule). Validation rules mark the status of an attribute as validated. Translation rules mark the status according to the rule (in general, mark it as translated)
  2.3. For the case were the search node does not contain a value for the attribute, add also a result record that holds an empty value for the processed attribute (as the banner does not necessary hold a value for the attribute)
End
Implementation Notes
When the banners set includes more than one banner (i.e., a set of sub-banners), the order in which they are popped from the set might depend on the type of the sub-banners. For example start with vendor banner, then product banner, and finally version banner.

Selecting a node from the open list can be implemented according to different search policies such as breadth first search (BFS), depth first search (DFS), or some heuristic search.

Selecting the next attribute to be processed relates to attributes in the attributes scope of the banner (all if no scope was specified) that have not validated yet. The selection order can be a predefined order. For example, for CPE name attributes, typically start with the vendor attribute, then the product attribute, and then the different version attributes (version, update, language, sw_edition, target_sw, and target_hw). The decision also considers the attributes that have already processed and their status. If the last attribute to be processed was translated (extracted) but not validated yet then the attribute is the next to be processed (for further translation or validation).

The application of a translation rule is successful if the context attributes of the rule (if defined) match the already extracted attributes of the search node (for that purpose the vendor and the product attributes are extracted first), and the pattern of the rule matches a substring of the banner, or the already extracted attribute. The extracted attributes are those specified in the rule. Their value is set according to the specified attribute value in the rule. When $i if appears within the attribute value of the rule, is replaced by the i-th group of the regular expression of the pattern.

The application of a validation rule is successful if the context attribute of the rule (if defined) matches the already extracted attributes of the search node, and the pattern of the rule matches a substring of the banner, or the already extracted attribute. The pattern matching might be insensitive to lower and upper case, and might relate to an underscore (I') appears in the pattern as a blank (due to CPE conventions). The extracted attribute (or already existing attribute) gets the validated status.

An Example

The next table presents an example for applying the algorithm to a set of banners that describe a product.
The set of banners includes:
a vendor banner: "Microsoft"
a product banner: "Microsoft® Windows Vista™ Enterprise Service Pack 1"
a version banner: "6.0.6000"
The knowledgebase that is used relate to CPE 2.3 set of name attributes, and some of its validation and translation rules were presented in the Knowledgebase section.
The table shows the development of search nodes from the empty search node to a search node that includes the extracted name attributes, and can be considered as a good translation result.
The extracted attributes are:
vendor: micro soft
product: windows_vista
version: -
update: sp1
sw_edition: enterprise
That corresponds to the following CPE 2.3 presentation of product names:
a. cpe:2.3:o:microsoft:windows_vista:-:sp1::::enterprise
The table focuses only at one search path (one successor node at each step). Note that in principle, a search node might be replaced by several search nodes each of which represents another alternative of applying a rule.
The Search Node information includes the attribute at focus (the last to be processed) and the attributes extracted so far, including their value, their status (translated, or validated), and the source for the extracted value—the banner and the characters range.

| Step | Action | Result Search |
| --- | --- | --- |
| 1 | Start with the empty Search Node | Empty Node |
| 2 | Focus at the vendor banner: "Microsoft" Apply the <vendor = Microsoft> validation rule | currAttribute: vendor Extracted Attributes: vendor: microsoft [validated, vendor banner; 1-9] |

-continued

| Step | Action | Result Search |
|---|---|---|
| 3 | Move to the product banner: "Microsoft ®Windows Vista ™ Enterprise Service Pack 1" Perform some filtering: "Microsoft Windows Vista Enterprise Service Pack 1" Apply the <product = windows_vista> validation rule (with vendor = micro soft as a context) | currAttribute: product Extracted Attributes: vendor: microsoft [validated, vendor banner; 1-9] product: windows_vista [validated, product banner; 12-24] |
| 4 | Apply the <version = - > validation rule (with product = windows_vista as a context). Version is marked as NA. | currAttribute: version Extracted Attributes: vendor: microsoft [validated, vendor banner; 1-9] product: windows_vista [validated, product banner; 12-24] version: - [validated, vendor banner] |
| 5 | Apply the <service pack(<int>) -> update = sp$1> translation rule | currAttribute: update Extracted Attributes: vendor: micro soft [validated, vendor banner; 1-9] product: windows_vista [validated, product banner; 12-24] version: - [validated, product banner] update: sp1 [translated, product banner, 38-51] |
| 6 | Apply the <update = sp<int>> validation rule (with product = windows_vista as a context) | currAttribute: update Extracted Attributes: vendor: micro soft [validated, vendor banner; 1-9] product: windows_vista [validated, product banner; 12-24] version: - [validated, product banner] update: sp1 [validated, product banner, 38-51] |
| 7 | Apply the <sw_edition = enterprise> validation rule (with product = windows_vista as a context | currAttribute: sw_edition Extracted Attributes: vendor: micro soft [validated, vendor banner; 1-9] product: windows_vista [validated, product banner; 12-24] version: - validated, [vendor banner] update: sp1 [validated, product banner, 38-51] sw_edition: enterprise [validated, product banner, 27-36] |
| 8 | Move to the version banner: 6.0.6000 No version is extracted from the banner as the version is NA for the product The coverage rate is computed (is found to be 100% as all was covered except the version which is irrelevant for that product). As a result, the alternative gets a high score | currAttribute: null Extracted Attributes: vendor: microsoft [validated, vendor banner; 1-9] product: windows_vista [validated, product banner; 12-24] version: - validated, [vendor banner] update: sp1 [validated, product banner, 38-51] sw_edition: enterprise [validated, product banner, 27-36] coverageRate: 1 (100%); score: High |

Building an Attribute Schema

This section describes a method for building an attributes schema based on a concrete products dictionary Product dictionaries tend to include an enumeration of the products and their known versions.

For a CPE dictionary, for example, the enumeration of Windows Vista products might be something similar to the following list:
a. cpe:2.3:o:microsoft:windows_vista::sp1
b. cpe:2.3:o:microsoft:windows_vista::sp2
c. cpe:2.3:o:microsoft:windows_vista::beta
d. cpe:2.3:o:microsoft:windows_vista::beta1
e. cpe:2.3:o:microsoft:windows_vista::beta2
f. cpe:2.3:o:microsoft:windows_vista::::::x64
g. cpe:2.3:o:microsoft:windows_vista sp1:::::::x64
h. cpe:2.3:o:microsoft:windows_vista::sp1::::enterprise::x64
i. cpe:2.3:o:microsoft:windows_vista::sp1::::business::x64
j. cpe:2.3:o:microsoft:windows_vista::::::::x86
k. cpe:2.3:o:microsoft:windows_vista:::::enterprise::x86 i.e., it includes a list of CPE names, each of which is a list of attribute vales (empty or non-empty).

Figure 2:
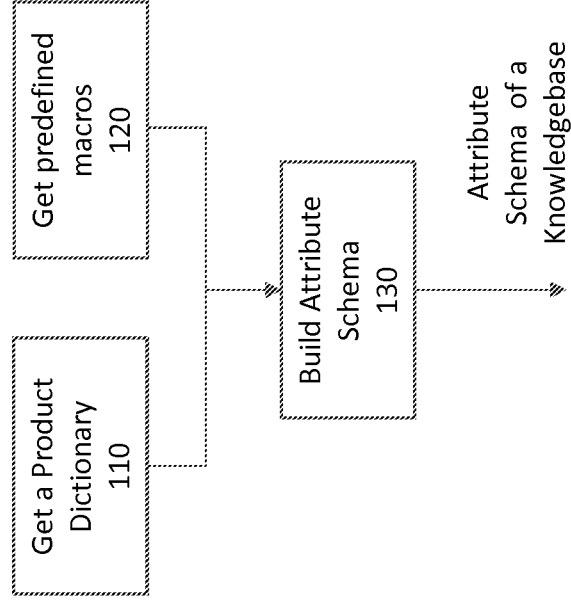
FIG. 2 illustrates a method according to an embodiment of the invention.

The method 100 illustrated in FIG. 2 can be used for building the attribute schema for a product dictionary that consists of enumeration of products and their versions names using name attributes.

In step 110, the list of product names is read from the dictionary.

In step 120 a list of predefined macros is retrieved. A macro is a predefined regular expression that is associated with a name. The macros define which abstraction is permitted, i.e., replacing a set of values that match a regular expression by the name of the macro. For example, the macro that defines dotted_version as the regular expression "[\d]+\.[\d\.]*\d", allows to representing a set of versions like 1.1, 1.2, 1.2.1, 1.3 as dotted_version.

In step 130, the attribute schema is built, and is represented using a set of validation rules. The following algorithm, describes that in details.

Algorithm Build Schema
Input:
  a. List of product names specified using a list of name attributes
  b. Set of predefined macros
Output:
  a. Validation rules
The Logic:
Begin
1. Read the entries (product names) appears in the dictionary
2. For each vendor name appear in the dictionary, create a vendor validation rule:
   Attribute Name=vendor, Attribute value=name of the vendor
3. For each software product name that appears in the dictionary,
   3.1. Create a product validation rule:
     Vendor Context=vendor name, Attribute Name=product, Attribute value=name of the product
   3.2. For each entry in the dictionary related to the product, add a validation rule for each non empty attribute, if it does not exist yet. The rules are of the form:
     Product-Context=product name, Attribute Name=name of the attribute, Attribute value=value of the attribute
   3.3. For each attribute with the context of the product try to replace rules which relate to specific values by a smaller set of rules that includes a pattern (regular expression). This can be done by some technique for identifying patterns that explain (match) a set of strings.
   3.4. For certain set of pre-defined attributes (e.g. version), that have no identified validation rules (no values appear in the enumeration) create a validation rule that states that the attribute is not applicable for the product:
     Product-Context=product name, Attribute Name=name of the attribute, Attribute value='-'
End An example for a pattern identification technique mentioned in phase 3.3 can be the following. For the product and attribute at focus:
  a. Look for a regular expression specified in a pre-defined macro that matches all or part of the attribute values of the attribute. The identified pattern in that case has the form <identified_macro>
  b. Look for a (maximal) prefix that is common to attribute values of the attribute, followed by a regular expression specified in a pre-defined macro that matches the suffix of these attribute values. The identified pattern in that case has the form
  c. identified_prefix<identified_macro>
  d. Each pattern found in that way can be associated with a counter (hit count) of the attribute values it matched.
  e. Select the pattern with the maximal hit count, and replace the validation rules of the matching attribute values by a single rule that includes the identified pattern.
  f. Repeat that process for the rest the attribute values, until no patterns with hit count greater than one are found.

g. Validation rules of attribute values that did not match a pattern are left as is.

Note: When the same set of attribute values matches two macros prefer the one with the more specific regular expression.

When applying the method to the enumeration of the Windows Vista products presented above we get at the end of phase 3.2 the following validation rules:

| Rule ID | Vendor Context | Product Context | CPE Name Attribute | Pattern |
|---|---|---|---|---|
| 7 | | | vendor | microsoft |
| 8 | microsoft | | product | windows_vista |
| 9 | | windows_vista | update | sp1 |
| 10 | | windows_vista | update | sp2 |
| 11 | | windows_vista | update | beta |
| 12 | | windows_vista | update | beta1 |
| 13 | | windows_vista | update | beta2 |
| 14 | | windows_vista | sw_edition | business |
| 15 | | windows_vista | sw_edition | enterprise |
| 16 | | windows_vista | target_hw | x64 |
| 17 | | windows_vista | target_sw | x86 |

Applying phase 3.3 of the process, considering the pre-defined macros, updates the validation rules to:

| Rule ID | Vendor Context | Product Context | CPE Name Attribute | Pattern |
|---|---|---|---|---|
| 7 | | | vendor | microsoft |
| 8 | microsoft | | product | windows_vista |
| 18 | | windows_vista | update | sp<int> |
| 11 | | windows_vista | update | beta |
| 19 | | windows_vista | update | beta<int> |
| 14 | | windows_vista | sw_edition | business |
| 15 | | windows_vista | sw_edition | enterprise |
| 20 | | windows_vista | target_hw | x<int> |

The predefined macro could be for example:

| Macro ID | Name | Pattern |
|---|---|---|
| 1 | dotted_version | [\d] + \.[\d\.]*\d |
| 2 | int | \d+ |

In this example, only the <int> macro matched suffixes of attribute values.

After applying phase 3.4 with considering only version as a predefined attribute for creating non-applicable attribute rules, the table is updated to include additional rule:

| Rule ID | Vendor Context | Product Context | CPE Name Attribute | Pattern |
|---|---|---|---|---|
| 7 | | | vendor | microsoft |
| 8 | microsoft | | product | windows_vista |
| 18 | | windows_vista | update | sp<int> |
| 11 | | windows_vista | update | beta |
| 19 | | windows_vista | update | beta<int> |
| 14 | | windows_vista | sw_edition | business |
| 15 | | windows_vista | sw_edition | enterprise |
| 20 | | windows_vista | target_hw | x<int> |
| 21 | | windows_vista | version | — |

Translating Product Names

This section describes a method for translating a product name according to one dictionary to a product name according to a second dictionary.

The assumption is that a product name according to a dictionary is represented as a set of name attributes which describe the product and its version (version in its wide meaning: version, update, edition, etc.).

The set of attributes used by the two dictionaries might be different, and the set of valid values for the attributes of the different dictionaries might be different as well.

An example, for two dictionaries could be CPE 2.2, and CPE 2.3. In CPE 2.3, the edition attribute of CPE 2.2, was split into three more specific attributes: software edition, target software, and target hardware.

In general, the translation is not limited to two CPE dictionaries.

Figure 3:
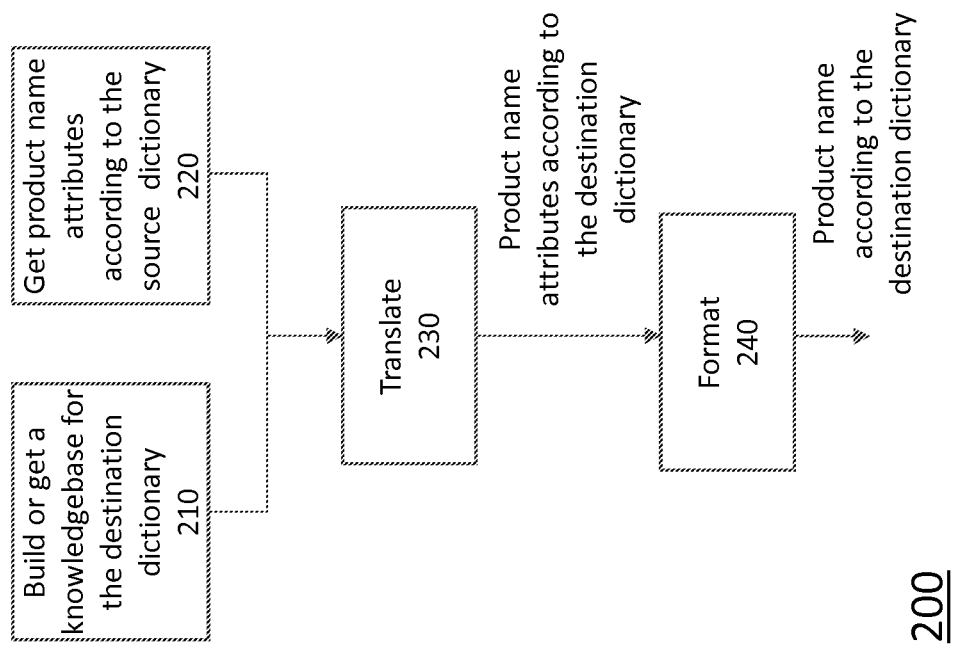
FIG. 3 illustrates a method according to an embodiment of the invention.

The method 200 is illustrated in FIG. 3.

Step 210 builds (or gets) a product knowledgebase that its attributes schema (the validation rules) describes the target dictionary, and the translating rules specify possible translations of vendor, product, and version terms into equivalent terms or into attributes of the target dictionary.

The method described in the "Building Attributes Schema" section can be used for automatically building the validation rules.

Step 220, relates to getting a product name according to the source dictionary. It is assumed that the product name consists of a set of name attributes. Optionally, each name attribute is associated with attributes scope—a property that specifies which destination attributes it might cover. For example, when translating from CPE 2.2, to CPE 2.3, the attributes scope of the edition name attribute is specified as: sw_edition, target_sw, and target_hw.

Step 230 performs the translation to the format of the destination dictionary. It actually uses a Banner Translation algorithm such as the one described in the Banner Translation section in conjunction with the specified knowledgebase. The input for the Banner Translation is a set of banners that correspond to the name attributes (those mentioned in step 220). Each banner might be associated with attribute scope property (if specified in the input). The output of the Banner Translation is a set of name attributes according to the destination dictionary (comply with attributes schema of the knowledgebase).

Step 240 formats the destination name attributes according to the name convention of the destination dictionary: ordering the attributes according to a certain order, adding a prefix, and placing delimiters between the attributes.

For example, if the destination is CPE 2.3, the prefix "cpe:2.3:" is added and ':' is placed in between the attributes.

Example

When translating the "cpe:/o:microsoft:windows_vista::sp1:x64-enterprise" product name from CPE 2.2 to CPE 2.3, the following happens:

The input name (in CPE 2.2) is split into banners:
a. Part banner=o (attributes scope: part)
b. Vendor banner=Microsoft (attributes scope: vendor)
c. Product banner=windows_vista (attributes scope product)
d. Update banner=sp1 (attributes scope: update)
e. Edition banner=x64-enterprise (attributes scope: sw_edition, target_sw, target_hw)

The banner translation algorithm identifies the target attributes:
a. part attribute=o
b. vendor attributer=microsoft
c. product attribute=windows_vista
d. update attribute=sp1
e. sw_edition attribute=enterprise
f. target_hw attribute=x64

The target product name is formatted to:
a. cpe:2.3:o:microsoft:windows_vista::sp1:::::enterprise::x64

Note that the method could also be applied when the distance between the dictionaries is much larger than that.

Translating Specifications of Affected Products of Vulnerabilities and Detecting Vulnerabilities of a Host When a new vulnerability is published, the publication specifies the affected (or vulnerable) products (this is sometime called affected software). The affected products are usually specified using a free text that relates to the name of the product, its version, and edition.

For example, a Microsoft Bulletin (e.g., MS12-020) states that "Windows Vista x64 Edition Service Pack 2" is an affected product (affected software) of a vulnerability (vulnerability CVE-2012-0002) [4,5].

The publication of new vulnerabilities could come from different sources such as software vendors, security research groups, threat alert services, security companies and organizations, and others.

The formats that are used for specifying the affected products might be different from source to source.

The banner translation algorithm can be used to translate the affected products information in these reports into a normalized name according to some dictionary or attributes schema. For example, translation into CPE 2.3 with certain attributes schema:
cpe:2.3:o:microsoft:windows_vista::sp2::::::::x64

Note that some small enhancements of the algorithm might be required in order to handle specifications that relate to range of product version or to all the versions before a specified version (parsing and representing: range, smaller than, and smaller or equal than).

The normalized representation can be used to detect vulnerabilities of a host—i.e., checking if a host is vulnerable with a certain set of vulnerabilities. By the term host or computer we relate to any device (physical or virtual) on which software can be installed and/or that can execute instructions stored in a non-transitory computer readable medium. That includes servers, desktops, network devices, security devices, mobile devices, industrial control devices, equipment with software components, sensors, and more. Any of the methods can be executed by a computer and may be executed by a translation module hosted by a computer.

To do that the names of the products (or applications) installed on the host should be normalized using exactly the same dictionary or attributes schema. This can be done by applying the banner translation algorithm to the product banners with the same Knowledgebase that was used to translate the affected products banners.

Once the product and the affected products are in the same language (the same attributes schema), checking if the product is vulnerable or not is done by a matching algorithm that compares sets of attributes—name attributes of affected products and name attributes of host products.

Figure 4:
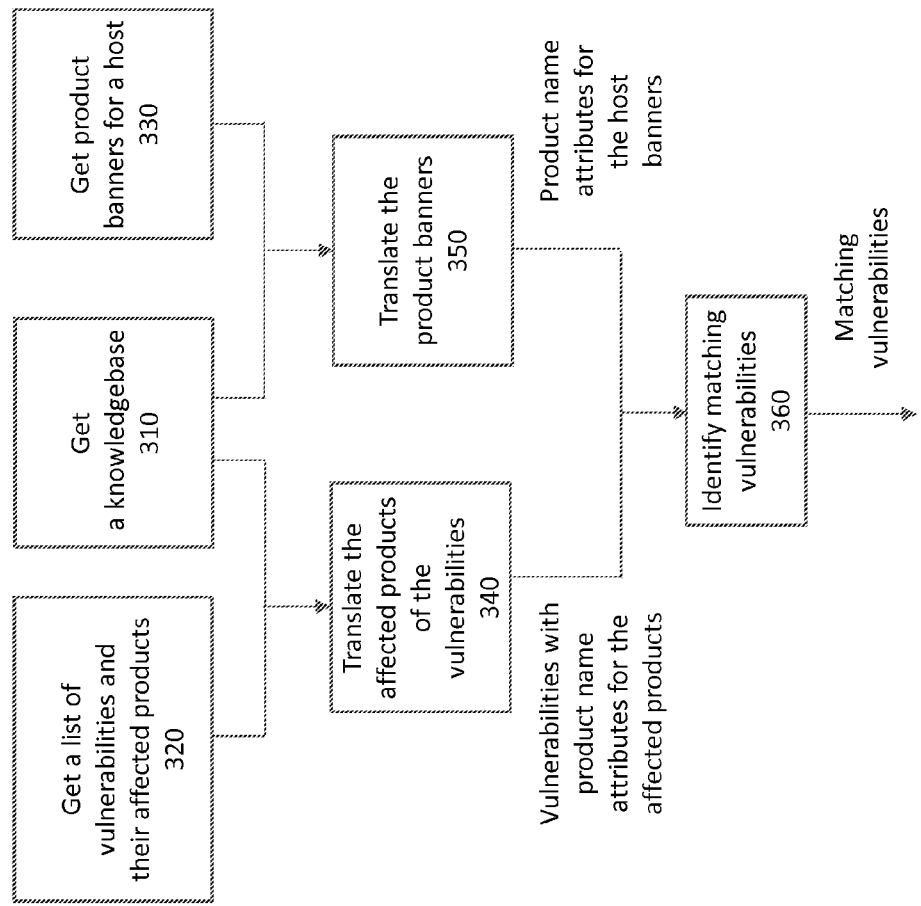
FIG. 4 illustrates a method according to an embodiment of the invention.

A method 300 for translating the specifications of affected products of vulnerabilities and detecting vulnerabilities of a host is illustrated in FIG. 4.

In step 310, the knowledgebase is retrieved. The knowledgebase is typically specified using a set of rules as described in the Knowledgebase section.

In step 320, a vulnerability data structure such as a vulnerability list is retrieved. The source of the list could be for example, a vulnerability dictionary or a report on new published vulnerabilities. It is assumed that each vulnerability (whatever is its source) has a specification of affected products. In general, the specification specifies for which products (and versions), and for which operating systems the vulnerability exists. It could be organized as a simple list of products and their version or as some type of a Boolean condition that relates to products and their versions. The Boolean condition can be, for example, an OR condition of AND terms. e.g., product p AND operating system of OR product p1 AND operating system o2.

Each affected product (including the operating system) is usually specified by some free text format, or by naming convention according to some dictionary, e.g., CPE dictionary.

The affected product specification can relate also to range of product version or to all the versions before a specified version.

In step 340, the affected products of the vulnerabilities are translated into sets of product name attributes that comply with the attributes schema in the knowledgebase. This can be done using the banner translation algorithm described above.

In case an affected product is specified using name attributes according to some product dictionary, the name attributes are translated into name attributes which comply with the Knowledgebase as described in the Translating Product Names section. In general, this is done by relating to each name attribute as a banner (sub-banner) of the product. e.g., vendor banner, product name banner, version banner, update banner, language banner, and edition banner. The translation algorithm is applied to that set of banners.

For example, the National Vulnerability Database holds for each CVE Vulnerability the vulnerable software and versions (i.e., the affected products) expressed in CPE 2.2 (i.e., the name attributes are according to NIST CPE product dictionary).

If the decision is to work with some Knowledgebase that relates to a CPE 2.3 dictionary (a formal one or a propriety one), the following should be done: translate the affected products of vulnerabilities specified according to CPE 2.2 to name attributes according to CPE 2.3.

In step 330, the product banners of the host are retrieved. Product banners of host can be retrieved from different sources such as patch or asset managers, or can be collected using different techniques such as scanning the host for installed products (or services).

The product banners typically include the banner of the operating system and the banners of products (or applications) installed on the host.

The banner of a product could be a single banner or a set of banners that relate to the product (such as vendor, product name, and version).

In step 350, banners of the host are translated into sets of product name attributes that comply with the attributes schema in the knowledgebase (the same knowledge base that was used for translating the affected products of vulnerabilities).

In the case of CPE 2.3 related knowledgebase, each successful translation of a banner produces a set of CPE 2.3 name attributes (vendor, product, version, update, software edition, hardware edition, etc.). A coverage rate or a confidence score can be associated with the translation result. The Translation can be done using the Banner Translation algorithm described in the Banner Translation section.

In step 360, vulnerabilities that their affected products match products of the host are identified.

That is done as following:

For each software product of the host (based on the output of step 350) go through the vulnerabilities in the list (the output of step 340) that relate to that product.

For each such vulnerability check if there is a match between the name attributes of the affected products of the vulnerability and the name attributes of the product (matching of version, update, software edition, hardware edition, etc.).

Note that the matching process should consider cases where some of the name attributes (of the product or the affected product) are empty, i.e., they match any value. The matching process should also consider cases where there are some range conditions for the version and update of the affected products (between, smaller than, etc.).

The affected products might also impose a condition related to the operating system name and version (in addition to the product name and version). Matching to the host operating system can be checked in a similar way.

In implementation of the method steps 310, 320 and 340 could be performed once (or whenever the set of vulnerabilities is changed), and then performing steps 330, 350 and 360 for each host that has to be examined.

The vulnerabilities of some products (e.g., Microsoft products) can be fixed by applying patches that do not affect the version of the product (i.e., they are not expressed in the banner). In this case, an addition step can be applied:

Out of the list of identified vulnerabilities, filter out vulnerabilities that a patch that fixes them is installed on the host (i.e. it appears in the list of installed patches that is retrieved from the host).

An Example

Assume that vulnerability MS12-020 appears in a list of vulnerabilities (a dictionary or new published vulnerabilities).

Its affected products (software) include:
a. Windows XP Service Pack3
b. Windows XP Professional x64 Edition Service Pack 2
c. Windows Vista x64 Edition Service Pack 2
d. and other products.

The product names are specified in a free text.

The host Desktop15 has several products and their banners are available.

This banners also include the banner of the operating system: "Microsoft® Windows Vista™ 64 bit Service Pack 2"

In step 340, the affected products of the vulnerabilities are translated into sets of name attributes using a knowledgebase.

For MS12-020 we get the following:
a. cpe:2.3:o:microsoft:windows_xp:-:sp3 (i.e., vendor: microsoft, product: windows_xp, version: -, update: sp3)
b. cpe:2.3:o:microsoft:windows_xp:-:sp2::::professional:: x64 (i.e., vendor: microsoft, product: windows_xp, version: -, update: sp2, sw_edition: professional, hw_edition: x64)
c. cpe:2.3:o:microsoft:windows_vista:-:sp2 x64 (i.e., vendor: microsoft, product: windows_vista, version:-, update: sp2 hw_edition: x64)

In step 350, the product banners of Desktop15 are translated according to the same knowledgebase.

For the operating system banner we get:
a. cpe:2.3:o:microsoft:windows_vista:-:sp2 x64 (i.e., vendor: microsoft, product: windows_vista, version: -, update: sp2 hw_edition: x64)

Step 360 identifies matching vulnerabilities. It finds a match between the name attributes of the affected products of MS12-020 and the name attributes of the operating system of Desktop15:
a. cpe:2.3:o:microsoft:windows_vista:-:sp2:::::::x64 (an affected product od MS-012-20)
b. cpe:2.3:o:microsoft:windows_vista:-:sp2:::::::x64 (a product installed on Desktop15)

Therefore it deducts that Desktop15 has the vulnerability MS12-020. In this case there is no patch that is installed on the host and resolves the vulnerability, and therefore it is reported as a vulnerability of the host.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for automatically translating a banner information, the method comprises:
   receiving by a computer the banner information, wherein the banner information is included in at least one banner and describes an identity of a software product; and
   translating by the computer the banner information into a unique software product identifier using a content of knowledgebase that comprises an attributes schema and translation rules; wherein each software product is associated with a single unique software product identifier; wherein the unique software product identifier comprises a structured set of attributes; wherein at least one translation rule is a pattern based translation rule; wherein the attributes schema specifies a set of allowable attributes and of allowable values of the attributes;
   wherein the translating comprises applying alternative sequences of translating and validation rules to the banner information and to attributes extracted from the banner information;
   wherein applying of alternative sequences comprises generating and using search nodes that represent attribute extraction alternatives that were explored during the applying of the translating.

2. The method according to claim 1 comprising determining the allowable values of the attributes by applying one or more validation rules.

3. The method according to claim 2 wherein the validation rules determine allowable values of an attribute name by specifying at least one pattern for the attribute values.

4. The method according to claim 2, wherein the validation rules define allowable content for attributes associated with at least one out of a certain vendor and a certain software product.

5. The method according to claim 1 wherein the pattern based translation rule specifies an allowable translation of a pattern of the banner information to value of an attribute of the unique software product identifier.

6. The method according to claim 5 wherein a translation rule comprises at least one pair of attribute name and an attribute value extracted from the pattern.

7. The method according to claim 1 wherein the attributes schema specifies a set of allowable attributes that complies with the Common Platform Enumeration (CPE) standard.

8. The method according to claim 1 wherein the translating comprises outputting a banner information coverage rate indication.

9. The method according to claim 1 wherein the translating comprises outputting a translation confidence score.

10. The method according to claim 1 wherein each search node holds a set of values of attributes that have already been extracted according to the alternative and status information relating to the attributes.

11. The method according to claim 1 wherein the generating of the search nodes comprises iteratively selecting an existing search node and applying validation or translation rules to the banner information or to already extracted attributes in order to validate an already extracted attribute or in order to extract additional attribute.

12. The method according to claim 1, comprising selecting extracted attribute values found by one of the alternative sequences of translating and validating rules.

13. The method according to claim 1, wherein the receiving of banner information is preceded by receiving by the computer at least one vulnerability that is capable of affecting the software product; and wherein the translating is followed by associating the at least one vulnerability with the unique software product identifier.

14. The method according to claim 13 further comprising evaluating a parameter of an attack that involves a computer that hosts the software product.

15. A non-transitory computer readable medium that stores instructions for:
  receiving by a computer, banner information, wherein the banner information is included in at least one banner and describes an identity of a software product; and
  translating by the computer the banner information into a unique software product identifier using a content of knowledgebase that comprises an attributes schema and translation rules; wherein each software product is associated with a single unique software product identifier; wherein the unique software product identifier comprises a structures set of attributes; wherein at least one translation rule is a pattern based translation rule; wherein the attributes schema specific a set of allowable attributes and of allowable values of the attributes;
  wherein the translating comprises applying alternative sequences of translating and validation rules to the banner information and to attributes extracted from the banner information;
  wherein applying of alternative sequences comprises generating and using search nodes that represent attribute extraction alternatives that were explored during the applying of the translating.

* * * * *